United States Patent [19]

Ecer et al.

[11] 4,455,471

[45] Jun. 19, 1984

[54] ARC WELDING METHOD AND ELECTRODE FOR NARROW GROOVE WELDING

[75] Inventors: Gunes M. Ecer, Irvine, Calif.; Israel Stol, Monroeville; Gerald G. Lessmann, Pleasant Hills, both of Pa.

[73] Assignee: Westinghouse Electric Corp., Pittsburgh, Pa.

[21] Appl. No.: 340,431

[22] Filed: Jan. 18, 1982

[51] Int. Cl.³ .............................................. B23K 9/30
[52] U.S. Cl. ............................ 219/125.12; 219/137 R; 219/145.21
[58] Field of Search ........................ 219/145.21, 125.12, 219/76.15, 137 R, 145.1

[56] References Cited

U.S. PATENT DOCUMENTS 3,989,921  11/1976  Ohi et al. ........................ 219/125.12
4,091,258  5/1978  Kano et al. ........................ 219/137 R
4,270,037  5/1981  Grinin et al. .................... 219/125.12

FOREIGN PATENT DOCUMENTS 977189  12/1964  United Kingdom .
1550714  8/1979  United Kingdom .
2100642  1/1983  United Kingdom .

*Primary Examiner*—Roy N. Envall, Jr.
*Assistant Examiner*—Alfred S. Keve
*Attorney, Agent, or Firm*—R. P. Lenart

[57] ABSTRACT

A narrow groove arc welding process includes angular oscillation of a non-consumable electrode having a tip which is radially displaced with respect to the central axis of the electrode. This provides for improved arc sweep and can be combined with prior art lateral and pivotal electrode oscillation techniques. A non-consumable electrode for use in this process is provided with a radially displaced tip. The electrode can be easily replaced by detaching it from a permanent rod electrode.

6 Claims, 14 Drawing Figures

 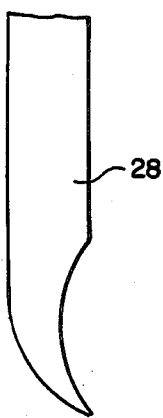 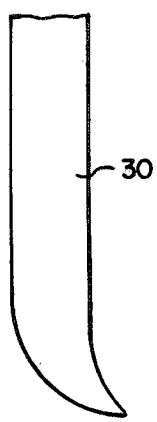 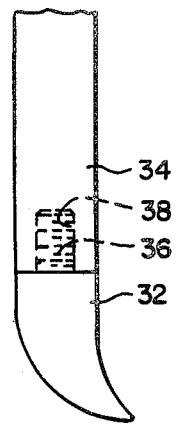
FIG.4A.  FIG.4B.  FIG.4C.  FIG.4D.
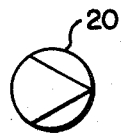 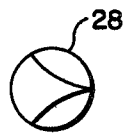 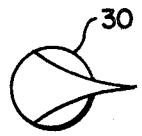 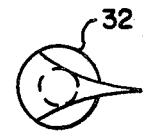
FIG.4E.  FIG.4F.  FIG.4G.  FIG.4H.

ARC WELDING METHOD AND ELECTRODE FOR NARROW GROOVE WELDING

BACKGROUND AND SUMMARY OF THE INVENTION

This invention relates to electric arc welding and more particularly to narrow groove welding.

In narrow groove welding, side walls of the welded joint, usually extremely thick plates, act as massive chills frequently making it difficult for the weld bead to fuse to the sides, causing defects related to a lack of fusion. Normally prescribed remedies such as increased heat input from a single welding torch or an array of welding torches have limited effectiveness.

In a hot wire tungsten inert gas welding process, side wall wetting can be improved if the arc established between a non-consumable tungsten electrode and the workpiece is oscillated to direct more of the arc energy to the sides of the groove. Several approaches to arc oscillation have been suggested or tried.

Magnetic pole pieces that can be programmed to produce a magnetic field of varying intensity and direction to cause oscillation of the welding arc have been used for some time. However, the use of this approach in narrow groove welding presents a space problem. The necessity of the pole piece being near the arc causes crowding within the joint. Further problems associated with heating of the pole pieces, disturbing influences of the magnetic forces created during welding of materials with high magnetic permeability, blocking of visual access to the weld pool, and difficulties in automatic monitoring have limited the desirability of this approach.

Magnetic oscillation of an arc can be caused through the use of twin electrodes which carry out of phase alternating currents. The practicality of this approach is limited by the fact that the frequency of oscillation will be relatively high, usually 60 Hz, and constant, and alternating current tends to increase the rate of deterioration of the tungsten electrode.

Conduction of the welding current away from the weld zone can be alternated between two or more grounds thereby causing the arc to oscillate under the changing influence of the magnetic field formed around the current path. This approach requires that the relative positions of the grounds and the arc remain constant, leading to the necessity of having the two grounds slide along the weld. Although such a scheme may work for weldments of simple geometry, it is mechanically too cumbersome for most welding jobs. Once again, crowding of the weld area may be a problem.

Some welding equipment utilizes an oscillating electrode assembly. Both lateral oscillation and oscillation about a pivot point have been used. An example of the pivot point oscillation technique is disclosed in U.S. Pat. No. 3,396,263, issued Aug. 6, 1968 to T. M. Evan et al.

Lateral oscillation and pivoting around a point produce the following arc sweeps respectively:

$$S_L = W - 2X - D \quad (1)$$

$$S_P = W - 2X - D + \frac{(W - 2X - D)(l_0 + h)}{2(b - l_0 - h)} \quad (2)$$

where (as shown in FIGS. 1A and 1B) S is the sweep distance for the hottest point under the arc, W is the distance between the plates being welded, D is the torch assembly diameter, X is the minimum distance between the torch assembly and the joint walls, h is the height of the tapered section of the electrode, $l_0$ is the arc length, and b is the pivot point distance from the weld root.

Since the torch assembly usually serves to hold the electrode in place, effectively chill it and supply shielding gas around it, the diameter D can be substantial. Although X can be kept to a small value, it necessarily has a finite value to protect the torch assembly from damage. Equations (1) and (2) inherently imply that $W - 2X$ must be much larger than D for effective oscillation. No oscillation is possible if $W - 2X = D$. Since W must be kept to a minimum, existing mechanical oscillation techniques are inadequate for some applications.

A number of welding processes and machines have been developed for oscillating an electrode in a consumable electrode welding system. Examples of these electrode oscillating techniques can be found in U.S. Pat. No. 4,074,105, issued Feb. 14, 1978 to Minehisa et al.; U.S. Pat. No. 3,576,966, issued May 4, 1971 to Sullivan; U.S. Pat. No. 2,163,657, issued June 27, 1939 to Beckman; U.S. Pat. No. 3,035,156, issued May 15, 1962 to Staley; and U.S. Pat. No. 3,609,292, issued Sept. 28, 1971 to Arnoldy. However, these patents do not address a non-consumable electrode welding system.

The methods and apparatus of the present invention represent an improvement in prior art arc welding processes using non-consumable electrodes, such as a hot wire tungsten inert gas process, where space considerations limit electrode assembly movement. Arc sweep distance is increased by angular oscillation around the axis of a non-consumable electrode having a tip which is radially displaced from the axis of the electrode. Rotation of this electrode will produce an arc sweep equal to twice the radial displacement of the tip.

The arc welding method of this invention is particularly useful for narrow groove welding and includes the creation of an arc between a metal workpiece and a non-consumable electrode, such as tungsten, having a radially offset tip and the angular oscillation of this electrode. In addition, lateral or pivotal oscillation or both can be added to the angular oscillation to achieve a greater sweep distance. This lateral or pivotal oscillation adds movement which is perpendicular to the welding line.

Non-consumable electrodes in accordance with this invention are generally straight with a shaped tip at one end which is radially displaced from the central axis of the electrodes. The opposite ends of these electrodes are provided with means, such as a threaded stud, for attachment to another electrode made of a highly conductive material such as copper. This highly conductive electrode can be of a smaller diameter due to its low resistivity, thereby allowing a smaller torch diameter.

BRIEF DESCRIPTION OF THE DRAWINGS

FIGS. 4A through 4H show alternate electrode geometries in accordance with the present invention.

DESCRIPTION OF THE PREFERRED EMBODIMENTS

Figure 1A:
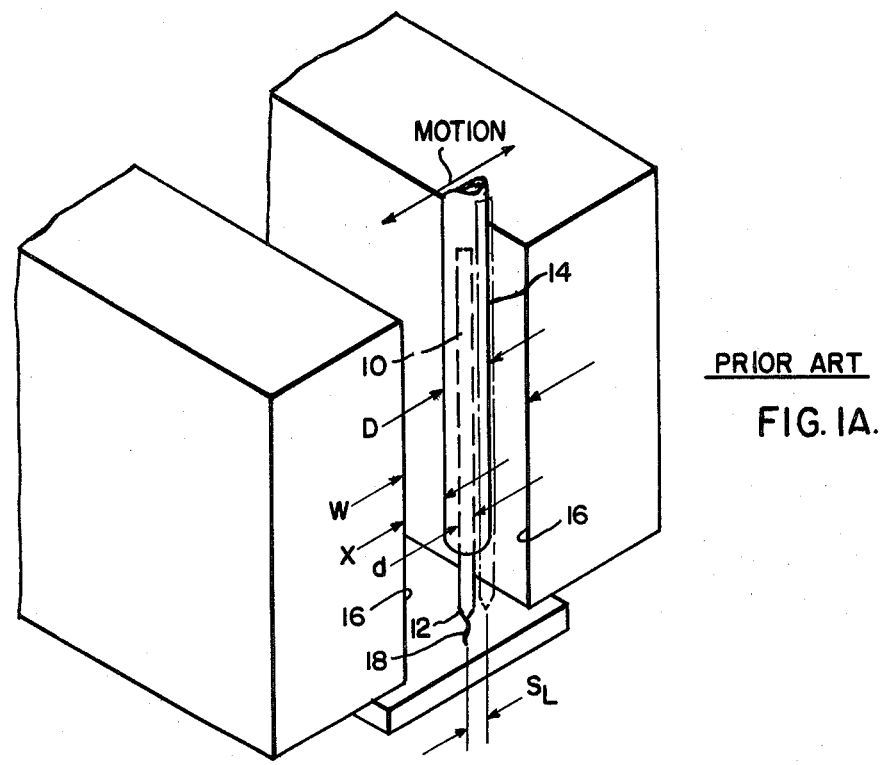
FIGS. 1A and 1B illustrate prior art methods of lateral and pivotal oscillation of non-consumable electrodes.

Referring to the drawings in detail, FIG. 1A shows a non-consumable electrode assembly having an electrode 10 having a conical tip 12 as used in a prior art welding process employing lateral electrode oscillation. The arc sweep distance $S_L$ for lateral electrode oscillation is given by:

$$S_L = W - 2X - D \quad (1)$$

where W is the distance between the plates being welded, D is the diameter of torch assemby 14 and X is the minimum distance between the torch assembly 14 and the joint walls 16.

Figure 1B:
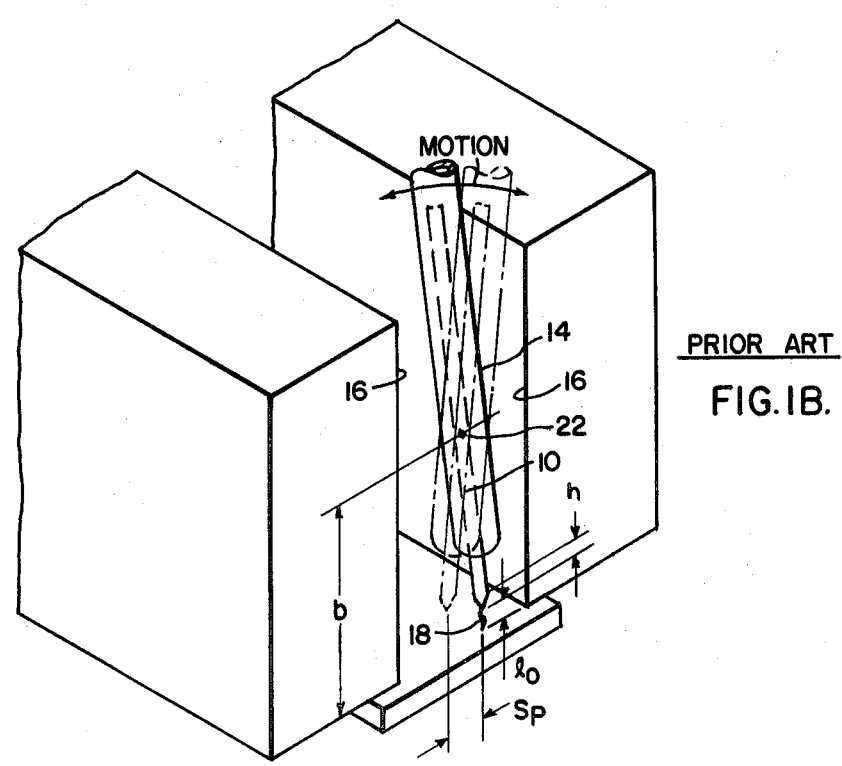

FIG. 1B shows a non-consumable electrode assembly used in a prior art welding process employing pivotal electrode oscillation. In this case, the arc sweep distance $S_P$ is given by:

$$S_P = W - 2X - D + \frac{(W - 2X - D)(l_o + h)}{2(b - l_o - h)} \quad (2)$$

where W, D and X are as defined above and $l_o$ is the length of arc 18, h is the height of the tapered section of electrode 10 and b is the distance from pivot point 22 to the weld root.

Figure 2:
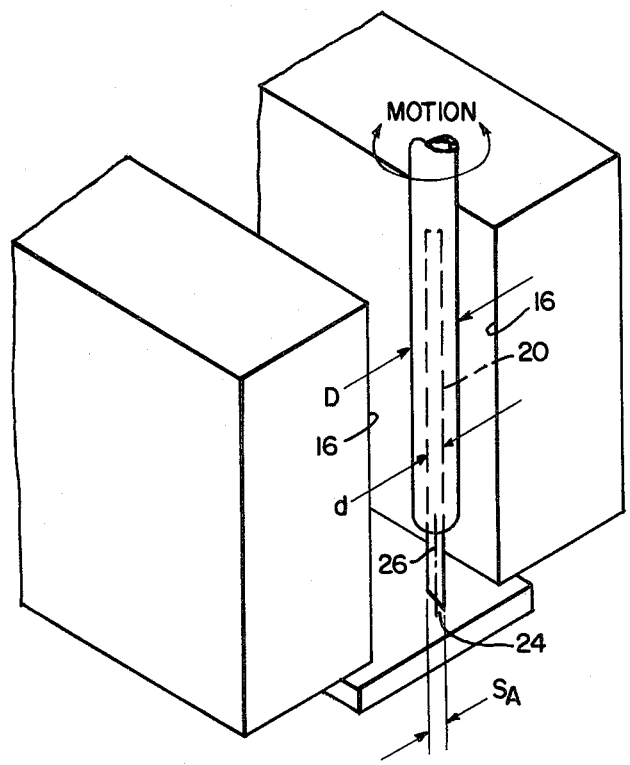
FIG. 2 shows a non-consumable electrode with a radially displaced tip which oscillates angularly in accordance with an embodiment of the present invention.

FIG. 2 shows a non-consumable electrode 20 with a radially displaced tip 24 which is subject to angular oscillations in accordance with the present invention. In this embodiment, the electrode tip has been displaced from the electrode axis 26 by a distance equal to the radius of the electrode 20. Simple radial oscillation of this electrode by known oscillating means produces an arc sweep $S_A$ equal to:

$$S_A = d \quad (3)$$

where d is the diameter of electrode 20. Since the arc sweep is directly proportional to electrode diameter, increasing the diameter increases the arc sweeps attained by the present invention.

Figure 3A:
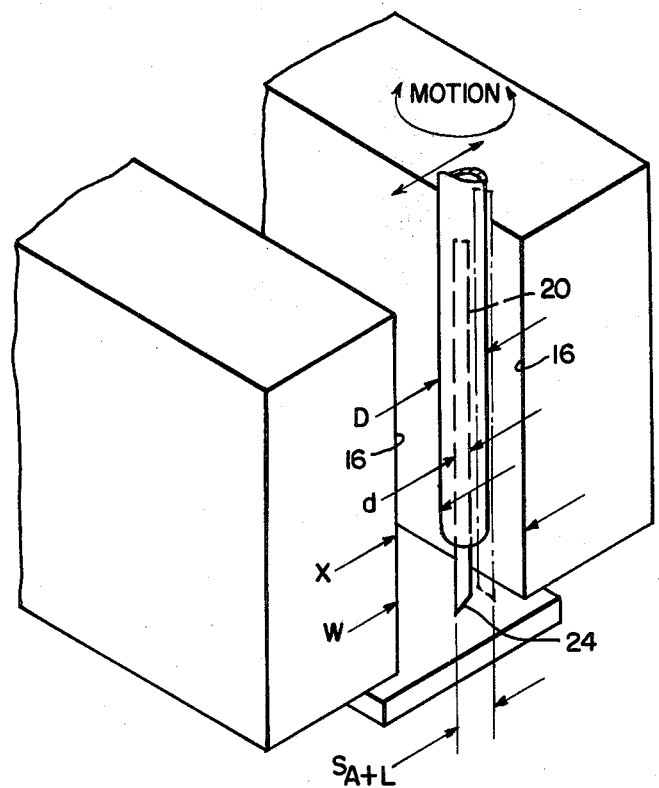
FIGS. 3A and 3B show the addition of lateral and pivotal oscillation to the electrode of FIG. 2 in accordance with the present invention.
Figure 3B:
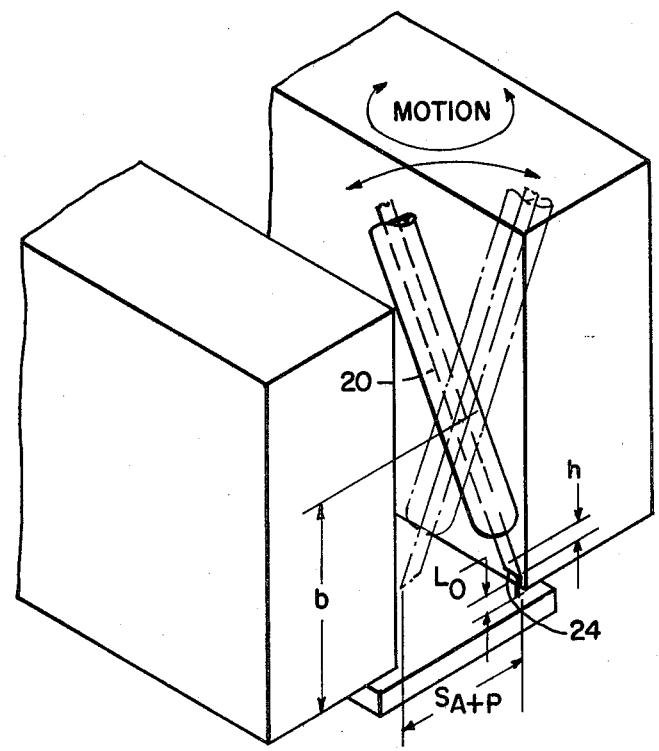

Arc sweep can also be increased by combining angular electrode oscillation with lateral or pivotal oscillation as shown in FIGS. 3A and 3B. The combination of angular and lateral oscillation produces an arc sweep $S_{A+L}$ of:

$$S_{A+L} = W - 2X - D + d \quad (4)$$

If angular and pivotal oscillation are combined, the arc sweep $S_{A+P}$ becomes:

$$S_{A+P} = W - 2X - D + \frac{(W - 2X - D)(l_o + h)}{2(b - l_o - h)} + d \quad (5)$$

Added sweep distance can be obtained if the electrode tip protrudes beyond the surface of the electrode. FIGS. 4A, 4B, 4C and 4D show various embodiments of non-consumable electrodes 20, 28, 30 and 32 which can be used in accordance with the present invention. These electrodes comprise a straight rod with a shaped tip and would be made of a non-consumable material such as tungsten. FIG. 4D shows an electrode 32 provided with means for attachment to a highly conductive electrode 34 made of material such as copper. In this embodiment the means for attachment comprises a threaded section 36 of electrode 32 and a tapped slot 38 in electrode 34. FIGS. 4E, 4F, 4G and 4H are end views of the electrodes shown in FIGS. 4A, 4B, 4C and 4D respectively. These end views illustrate the location of each electrode tip with respect to the electrode body. It should be apparent that simple angular oscillation of the electrodes of FIGS. 4C and 4D would produce arc sweeps in excess of the electrode diameter.

Electrode tip geometries may be varied within the scope of this invention, with the preferred geometry having a tip oriented toward the joint corners to direct the arc energy where it is needed most. Various electrode tip geometries may be fashioned by simply grinding existing rods as in FIG. 4A or by machining rods to provide means for attachment to a highly conductive electrode such as copper. This would eliminate the need for long stemmed electrodes as well as reduce the torch size, since smaller diameter copper electrode holders can be used without danger of overheating due to the low electrical resistance of copper.

Figure 5:
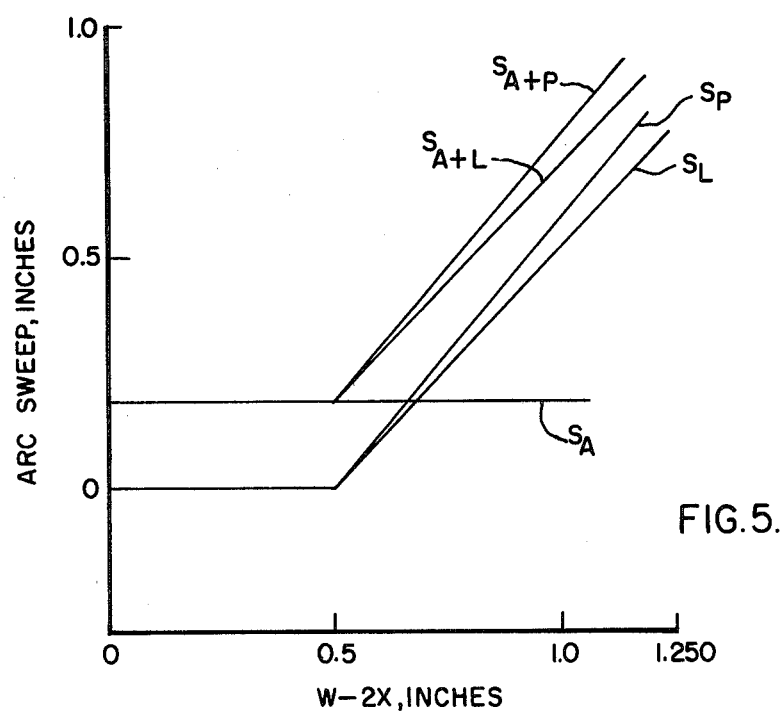
FIG. 5 shows the arc sweeps obtained with angular, lateral, and pivotal electrode oscillations and their combinations.

FIG. 5 shows the arc sweeps obtained with angular, lateral, and pivotal electrode oscillations and their combinations. In some cases, simple angular oscillation of an off-center tipped electrode alone may be an improvement over existing mechanical oscillation techniques. For example, using the off-center tip geometry of FIG. 4A, FIG. 5 shows that for a torch diameter D=0.5 inch, with $l_o$+h=0.3 inch, b=2.0 inches, and an electrode diameter of d=3/16 inch, when the distance between the plates being welded W minus twice the minimum torch clearance X is less than 0.66 inch, angular oscillation alone produces the greatest arc sweep.

The increased arc sweeps provided by this invention result in quality improvements in narrow groove welding processes. In some cases, the need for machined joint preparation may be eliminated, thereby providing substantial cost benefits.

What is claimed is:

1. An electric arc welding method in which molten metal is deposited along a welding line, comprising the steps of:
    causing an arc to be formed between a non-consumable electrode having a tip which is shaped to a point, radially displaced from the central axis of said electrode, and a metal workpiece;
    angularly oscillating said non-consumable electrode, thereby causing an arc sweep width greater than an arc sweep width which would occur with a non-consumable electrode having a centered tip; and
    simultaneously oscillating said non-consumable electrode about a pivot point located along said non-consumable electrode, thereby providing pivotal oscillation in a direction substantially perpendicular to said welding line.

2. The electric arc welding method as recited in claim 1, further comprising the step of:
    simultaneously oscillating said non-consumable electrode laterally along a line substantially perpendicular to said welding line.

3. The electric arc welding method as recited in claim 1, wherein said welding line comprises a narrow gap between two workpieces which are to be welded together.

4. The electric arc welding method as recited in claim 1 wherein said non-consumable electrode comprises:

a highly conductive rod;

an arc resistant rod having a tip and a central axis;

said tip being shaped to a point which is radially displaced from said central axis; and means for detachably connecting the end of said arc resistant rod opposite said tip to one end of said highly conductive rod.

5. An electric arc welding apparatus for depositing molten metal along a welding line, comprising:

a non-consumable electrode for conducting an arc to a workpiece, and having a tip and a central axis;

said tip being shaped to a point which is radially displaced from said central axis;

means for angularly oscillating said non-consumable electrode about said central axis, thereby causing an arc sweep width greater than an arc sweep width which would occur with a non-consumable electrode having a centered tip; and means for simultaneously oscillating said non-consumable electrode about a pivot point located along said non-consumable electrode, to provide pivotal oscillation in a direction substantially perpendicular to said welding line.

6. An electric arc welding apparatus as recited in claim 5, further comprising:

means for simultaneously oscillating said non-consumable electrode laterally along a line substantially perpendicular to said welding line.

* * * * *